(No Model.) 2 Sheets—Sheet 1.
F. B. TAIT & J. GROSS.
CORN PLANTER.
No. 412,306. Patented Oct. 8, 1889.
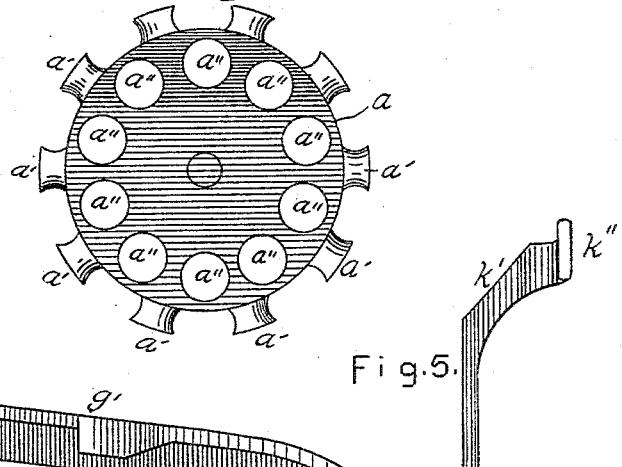
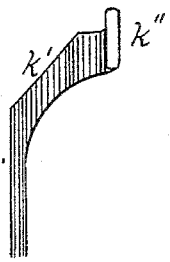
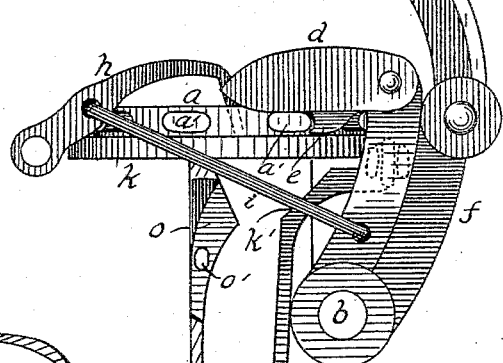
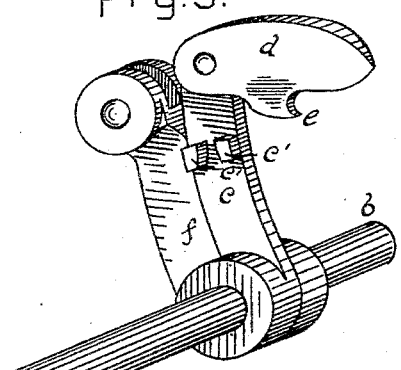
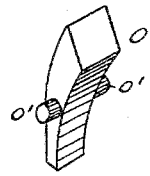
ATTEST
Helen Graham
W. W. Graham
INVENTORS
F. B. TAIT AND
JOHN GROSS
By L. P. Graham
Atty.

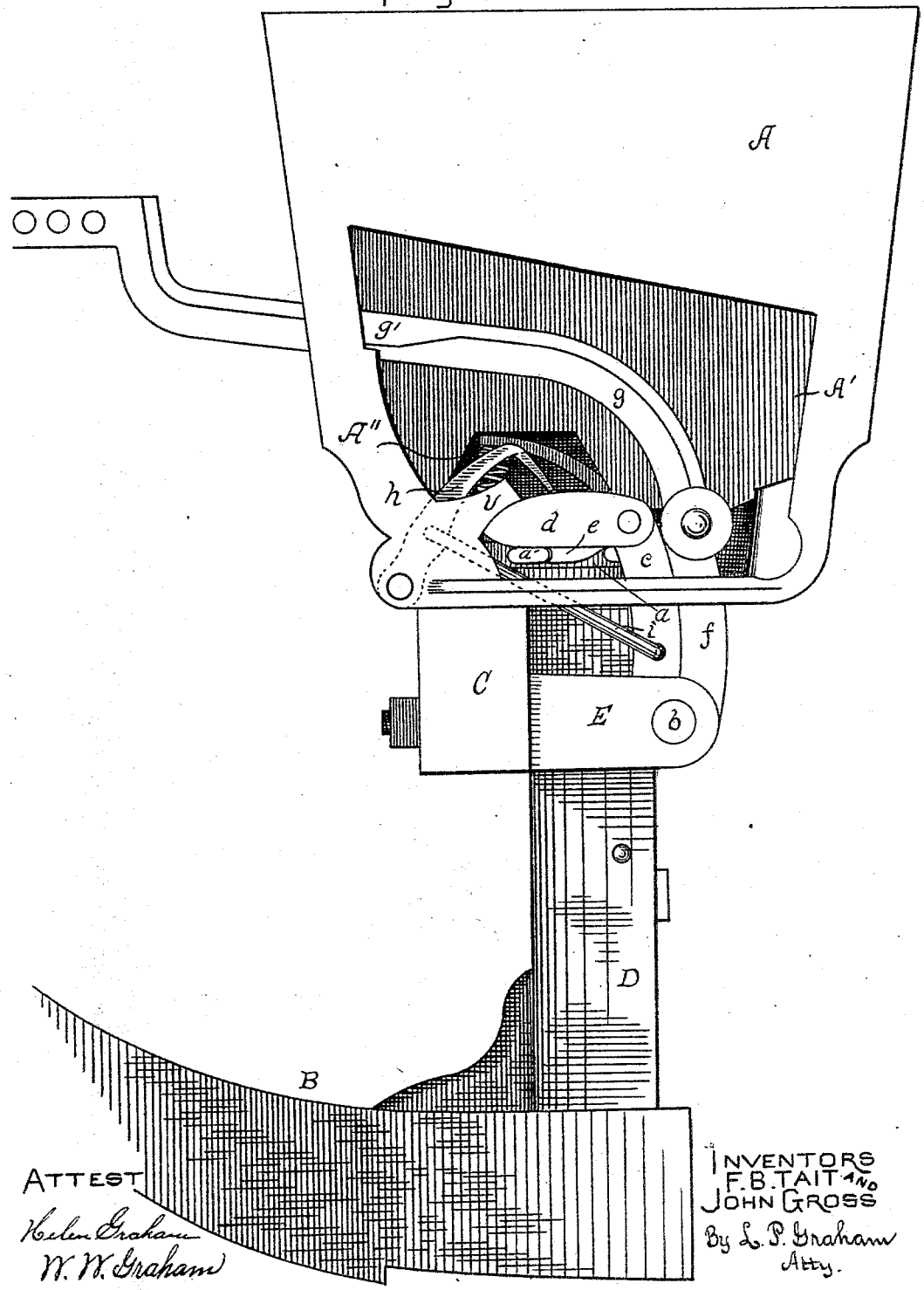

UNITED STATES PATENT OFFICE.

FELIX B. TAIT AND JOHN GROSS, OF DECATUR, ILLINOIS.

CORN-PLANTER.

SPECIFICATION forming part of Letters Patent No. 412,306, dated October 8, 1889.

Application filed March 20, 1889. Serial No. 304,036. (No model.)

*To all whom it may concern:*

Be it known that we, FELIX B. TAIT and JOHN GROSS, of the city of Decatur, county of Macon, and State of Illinois, have invented certain new and useful Improvements in Corn-Planters, of which the following is a specification.

Our invention relates to the dropping mechanism of corn-planters; and it consists in the details of construction and combinations of parts, hereinafter set forth and claimed.

In the drawings accompanying-and forming a part of this specification, Figure 1 is a plan of the seed-disk embodied in our device. Fig. 2 is a side elevation of said disk and the mechanism used to actuate the same, the part of the shank actively employed being shown in central vertical section. Fig. 3 is a perspective view of the disk-actuating arms and pawl. Fig. 4 is a perspective view of a yielding block that co-operates with the inclined upper end of the second drop-bar in a manner and for a purpose to be hereinafter explained. Fig. 5 is a side view of the upper end of the second drop-bar. Fig. 6 shows our device, in side elevation, applied to a seed-hopper and shank.

The seed-disk $a$ has peripheral teeth $a'$ and cells $a''$. The shaft $b$ traverses the planter transversely, and has a spring or weight to retract it after each operation of the check-row mechanism. This feature may be applied to the shaft in a variety of well-known ways, is readily apparent, and therefore not shown. Rigidly fixed on opposite ends of the shaft are disk-actuating arms, and as these arms, with their adjuncts, are duplications one of the other, differing only in arrangement, illustration and explanation of one will serve for both. Such an arm is designated by reference-letter $c$, and it carries the pivoted pawl $d$, which has the catch $e$, adapted to the teeth $a'$ and to the spaces between teeth of the disk $a$. Loosely mounted on shaft $b$ behind arm $c$ is arm $f$, and pivotally connected with arm $f$ is bar $g$, which is actuated directly or otherwise by the check-row mechanism. The curved finger-bar $h$ is pivoted in position to successively penetrate the cells of the disk as they are brought over the discharge-opening of plate $k$, and it is connected with arm $c$ by rod $i$. The second drop-bar $l$ pivots at $m$, and closes against a seat suitably formed of the front portion of the shank D. It is held normally closed by the action of spring $n$, and it forms, with the front and sides of the shank, a conduit for the corn. It has the inclined upper portion $k'$ and the lateral projection $k''$. (Seen clearly in Fig. 5 and indicated by dotted lines in Fig. 2.) The arm $c$ has lateral projections $c'$, and between these projections the lateral projection of the second drop-bar extends. (See Figs. 2 and 3.) The block $o$ has trunnions $o'$, that rest in bearings in the upper front portion of the shank D. Its weight is so distributed that its upper end tends to swing inwardly, and it is opposed to the upper end of the second drop-bar.

The seed box or hopper is shown at A in Fig. 6. The large recess A' admits the arms, the finger-bar, and the actuating-bar. The smaller and deeper recess A'' contains the cut-off mechanism, and it is through this recess that the finger-bar acts on the seed-disk. The projection $v$ is formed of or secured to a side of the seed-box, its under surface is inclined to conform to the termination of pawl $d$, and it stands in line with the direction of motion of said pawl. The recess A' is desirably closed by a plate suitably secured to the side of the box, thus incasing and protecting the working mechanism.

C is a cross-bar connecting the shanks and boxes.

E is a bracket forming a bearing for the shaft.

B is a runner or furrow-opener constructed in any desirable manner.

In Fig. 2 the device is shown as it appears preparatory to making a seed-deposit.

In Fig. 6 the shaft is shown as carried forward in an oscillatory manner by the check-row mechanism, but not yet retracted by the spring or weight used in such cases.

As the bar $g$ is drawn forward by the check-row mechanism, arm $f$ acts on arm $c$ and causes the pawl $d$ to advance the seed-disk one tooth. At the termination of the throw of the pawl the inclined projection $v$ presses the pawl against the teeth of the disk, and by friction and direct interposition of the pawl-catch, either or both, the disk is stopped. The initial movement of arm $c$ raises the end of the finger-bar $h$ out of the seed-cell, and so permits free rotation of the disk. As a seed-cell is presented to the discharge-aperture of plate k, which aperture is in line with the swing of the end of the finger-bar, the corn falls, ordinarily, into the conduit of the shank, and is retarded by the intervention of the inclined upper end of the second drop-bar and the projecting blocks, which are at this time in contact one with the other. As the shaft is retracted, the corn falls to the lower end of the shank, where it is temporarily retained by the then closed second drop, and in case corn is retained in the cell or the discharge-aperture, which may occasionally happen, it will be forced through by the finger-bar and reach the second drop in ample time to be discharged by a subsecutive operation of the planting mechanism. So it will be seen that through the operation of the retarding device the corn is prevented from reaching the second drop before the same is closed, and that the finger-bar assures the arrival of the corn at the second drop in time for final discharge.

If by any chance a grain of corn or other unyielding object should become interposed between the second drop-bar and the block o, the latter will readily yield to permit the complete operation of the device.

As the pawl-carrying arms are fixed rigidly on the shaft, it is evident that one will move with the other. This enables the planter to be operated from opposite sides alternately without the necessity of moving both bars g and both arms f.

The projection v tends to stop the forward throw of the pawl, and it is assisted in this by stop g' on arm g, which strikes against a portion of the seed-box and relieves the shaft of the strain that might otherwise be too severe.

We claim as new and desire to secure by Letters Patent—

1. In corn-planters, in combination, a rock-shaft, a seed-disk having peripheral teeth, an arm fixed on the shaft and carrying a pawl adapted to the teeth of the disk, and a secondary arm mounted loosely on the shaft behind the pawl-carrying arm, as set forth.

2. In corn-planters, in combination, a rock-shaft, a disk having seed-cells and peripheral teeth, an arm fixed on the shaft and carrying a pawl adapted to the teeth of the disk, a secondary arm mounted loosely on the shaft behind the pawl-carrying arm, a finger-bar adapted to the cells of the seed-disk, and a rod connecting the pawl-carrying arm with the finger-bar, as set forth.

3. In corn-planters, in combination, a seed-disk having peripheral teeth, a rock-shaft, an arm fixed on the shaft and carrying a pawl adapted to the teeth of the disk, a second drop-valve connected at its upper end with the pawl-carrying arm, and a secondary arm mounted loosely on the shaft behind the pawl-carrying arm, as set forth.

4. In corn-planters, in combination, a seed-disk, a disk-actuating arm fixed on a shaft, an arm loosely mounted on the shaft in contact with the fixed arm, and a bar to connect the loose arm with check-row mechanism, as set forth.

5. In corn-planters having a first and second drop, the intermediate corn-retarder, comprising the inclined upper end of the second drop-bar and the opposed yielding projection, as set forth.

In testimony whereof we sign our names in the presence of two subscribing witnesses.

FELIX B. TAIT.
JOHN GROSS.

Attest:
I. D. WALKER,
J. N. BILLS.